United States Patent
Picklyk

(10) Patent No.: US 8,117,506 B2
(45) Date of Patent: Feb. 14, 2012

(54) APPARATUS, AND ASSOCIATED METHOD, FOR REPORTING DELAYED COMMUNICATION OF DATA MESSAGES

(75) Inventor: Jeffrey Picklyk, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 12/785,331

(22) Filed: May 21, 2010

(65) Prior Publication Data

US 2011/0289364 A1 Nov. 24, 2011

(51) Int. Cl.
*G06F 11/00* (2006.01)
(52) U.S. Cl. ....... 714/47.2; 709/204; 709/206; 709/207; 709/227; 709/238; 714/4.1; 714/47.1; 714/55; 714/56
(58) Field of Classification Search .................. 709/227, 709/238, 204, 206, 207; 714/47.1, 47.2, 714/55, 56, 4.1
See application file for complete search history.

(56) References Cited

U.S. PATENT DOCUMENTS

| | | | | |
|---|---|---|---|---|
| 5,440,688 | A * | 8/1995 | Nishida | 714/4.1 |
| 6,119,167 | A | 9/2000 | Boyle et al. | |
| 6,175,732 | B1 * | 1/2001 | McDaniel et al. | 455/433 |
| 6,819,932 | B2 * | 11/2004 | Allison et al. | 455/466 |
| 7,020,697 | B1 * | 3/2006 | Goodman et al. | 709/223 |
| 7,051,099 | B2 * | 5/2006 | Ziegler et al. | 709/224 |
| 7,287,076 | B2 * | 10/2007 | Ewanchuk et al. | 709/224 |
| 7,403,994 | B1 * | 7/2008 | Vogl et al. | 709/227 |
| 7,657,628 | B1 * | 2/2010 | McDysan et al. | 709/225 |
| 7,792,909 | B2 * | 9/2010 | Lund et al. | 709/206 |
| 7,873,963 | B1 * | 1/2011 | Fair | 719/313 |
| 7,917,951 | B1 * | 3/2011 | Tarbotton et al. | 726/22 |
| 8,001,268 | B2 * | 8/2011 | Lund et al. | 709/242 |
| 8,037,144 | B2 * | 10/2011 | Lund et al. | 709/206 |
| 2003/0115508 | A1 * | 6/2003 | Ali et al. | 714/43 |
| 2004/0059789 | A1 | 3/2004 | Shum | |
| 2005/0262208 | A1 * | 11/2005 | Haviv et al. | 709/206 |
| 2006/0003764 | A1 * | 1/2006 | Saglam et al. | 455/432.1 |
| 2006/0168035 | A1 * | 7/2006 | Cai et al. | 709/206 |
| 2007/0124484 | A1 * | 5/2007 | Pearson et al. | 709/230 |
| 2007/0133602 | A1 * | 6/2007 | Russell | 370/467 |
| 2007/0208850 | A1 | 9/2007 | Lin et al. | |
| 2009/0271466 | A1 * | 10/2009 | Fields et al. | 709/201 |
| 2009/0319822 | A1 * | 12/2009 | Coronado et al. | 714/3 |
| 2010/0013639 | A1 * | 1/2010 | Revert | 340/572.1 |
| 2010/0211648 | A1 * | 8/2010 | Bhagat et al. | 709/206 |

FOREIGN PATENT DOCUMENTS

WO 2009/026220 A2 2/2009

OTHER PUBLICATIONS

Notification of Transmittal of the International Search Report and the Written Opinion of the International Searching Authority, Aug. 18, 2011.

* cited by examiner

*Primary Examiner* — Philip Guyton
*Assistant Examiner* — Joshua P Lottich

(57) ABSTRACT

An apparatus, and an associated method, reports when incidence of email or other data-message communication of a wireless network system. An analyzer analyzes logged information and determines the incidence, such as by calculating a ratio, of delayed versus timely message communications. If the ratio, or other indication, is beyond a threshold, a reporter generates a report to alert the high incidence of delayed communications.

18 Claims, 3 Drawing Sheets

APPARATUS, AND ASSOCIATED METHOD, FOR REPORTING DELAYED COMMUNICATION OF DATA MESSAGES

The present disclosure relates generally to a manner by which to facilitate reporting of delayed message delivery of data messages, such as email messages communicated by a wireless network. More particularly, the present disclosure relates to an apparatus, and an associated method, by which to determine a high incidence of occurrence of delayed communication of data messages and to generate a report to alert the delay.

A manager of a network is better able quickly to take corrective, or ameliorative, action when quickly notified of the problem.

BACKGROUND OF THE DISCLOSURE

The use of wireless devices, such as cellular mobile stations, through which to communicate is widespread. For many, use of cellular, or cellular-like, mobile stations provide a primary mechanism by which to communicate. And, with generally falling costs of communications in wireless communications systems as well as increasing communication capacities and availabilities, communications by way of a wireless communication system are likely to increase.

Amongst the communication services that are increasingly carried out by way of wireless communication systems are data messaging services, such as email services in which text, or multi-mode, data is communicated to, or from, a wireless device. Many wireless devices presently used by which to communicate by way of a cellular, or cellular-like, communication system include the capability of originating and terminating such email, or other text, messages. And, increased numbers of such data-capable devices shall likely be used by additional numbers of users.

Business, and other, enterprises increasingly make use of data-message communications pursuant to enterprise activities. And, when the enterprise personnel are provided with, or otherwise use, wireless devices to receive or to send such data messages, the users are able to send and to receive such messages when not positioned at an enterprise facility or location. Rather, the user needs only to be in communication connectivity with a wireless communication system to be able to communicate, i.e., send or receive, the data messages. At least one messaging system, utilizing an enterprise-maintained communication server, herein referred to at times as an enterprise server, provides for secured communication of enterprise data message over a public, wireless network, thereby to ensure the secure communication of the data messages. The enterprise server is placed in communication connectivity with an enterprise message server, such as a Microsoft Exchange™ Server. The Exchange, or other, server notifies the enterprise server when a message is to be communicated. Such notification is referred to herein as part of a notification procedure.

Many of the data messages that are communicated are time-insensitive, viz., are not of an informational content requiring their immediate review. However, some data messages are of more urgent natures, viz., are of content necessitating their more-immediate review. Messages associated with security-market transaction operations, for instance, are amongst those that are sometimes of urgent nature and must quickly be reviewed. Data messages pertaining to any of many other enterprise activities are, of course, also sometimes of urgent nature, also necessitating immediate review.

An existing mechanism by which to communicate data messages automatically forwards messages to their destinations, identified, e.g., by an end device's IP (internet protocol), mobile-related identifier, or other identification of the terminating device. In this mechanism, a notification procedure is, as just-noted, is used to notify the enterprise server of the message, and, in response, the enterprise server causes the routing of the message to its destination, e.g., a wireless device. When the communication environment is good, the large majority of the data messages are successfully communicated responsive to the notification procedure. That is to say, in good conditions, the notifications are detected, and the messages are routed to their destinations. However, if the communication conditions are poor, such as during high traffic conditions or poor radio or network conditions, some of the notifications are not delivered to the enterprise server, or are not properly processed, once delivered. And, as a result, the data messages are not successfully communicated responsive to the notification procedure. Such existing mechanism also provides for a rescan procedure by which to detect and resend the unsuccessfully-delivered messages. A rescan procedure, however, sometimes is performed significantly later than the original notification procedure, e.g., 20 minutes after the performance of the notification procedure.

If the unsuccessfully delivered data message is an urgent message, the lengthy period between the notification and rescan procedures, at the least, is disruptive to successful communications. And, there generally is not existing manner by which quickly to detect a high incidence of unsuccessful delivery of data messages responsive to the notification procedure. Instead, the manner conventionally used by which to make determination of a high incidence of unsuccessful delivery of data messages responsive to the notification procedure requires manual review of a log that is created during data-message communication operations. The log identifies the manner by which data messages have been communicated. Such a review is time-consuming and only provides historical information.

If a manner could be provided by which better, and more quickly, to identify incidence of slowly-delivered data messages, viz., unsuccessfully delivered responsive to a notification procedure, more speedy resolution of problems associated with such delivery can be carried out.

It is in light of this background information related to communications in a wireless, data messaging system that the significant improvements of the present disclosure have evolved.

DETAILED DESCRIPTION

Figure 1:
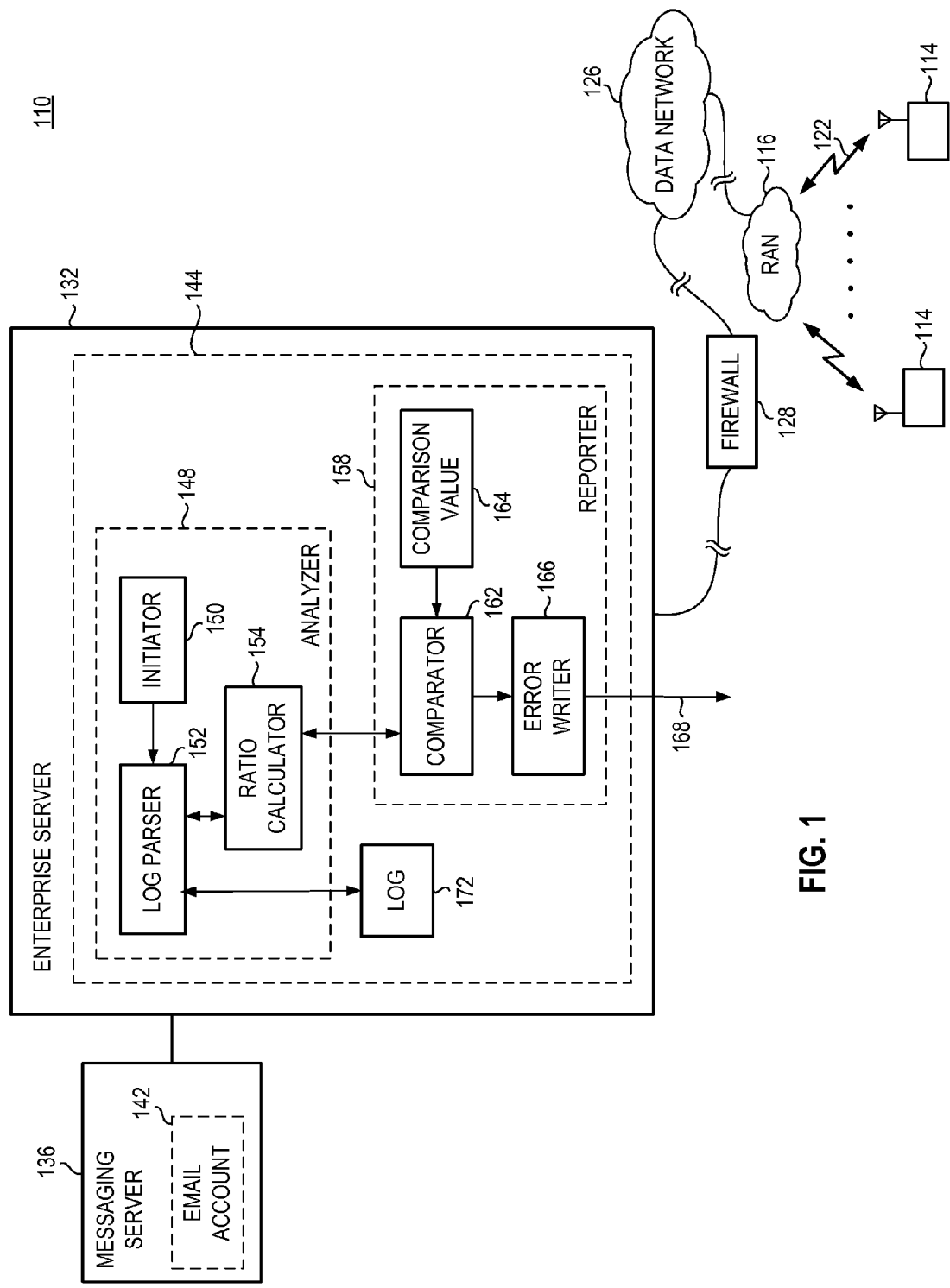
FIG. 1 illustrates a functional block diagram of a communication system that includes an embodiment of the present disclosure.

The present disclosure, accordingly, advantageously provides an apparatus, and an associated method, for facilitating reporting of delayed message delivery of data messages, such as email messages communicated by a wireless network.

Through operation of an embodiment of the present disclosure, a manner is provided by which to determine occurrence of a high incidence of delay communication of data messages and to generate a report to alert the delay.

By quickly determining a high incidence of delayed communication of data messages, and by quickly generating a report to alert the high incidence of delayed communications, action can more quickly be taken to ameliorate or compensate for the delayed communications.

In one aspect of the present disclosure, a log is created during communication operations by which data messages are communicated to wireless devices. The log identifies communicated data messages and the procedure used responsive to which the data messages are successfully communicated. The log indicates the procedure responsive to which each of the data messages is successfully communicated. The procedure is, e.g., one of a first procedure and a second procedure.

The procedures used by which to communicate the data messages comprise, for instance, a notification procedure and a rescan procedure. An email message for delivery to a terminating device is first communicated responsive to a notification procedure. If the data message is not successfully communicated responsive the notification procedure, a near-immediate communication of the data message, the failure is noticed in a rescan procedure and the message is sent responsive to the rescan procedure. When an indication is provided of the successful communication, responsive to either procedure, the communication is logged together with the indication of the communication procedure responsive to which the data message is successfully communicated.

In another aspect of the present disclosure, the logged information is parsed, such as at selected intervals or by special request. When parsed at timed intervals, the parsing is performed automatically, without need for operator initiation. Parsing of the logged information identifies the manner responsive to which the data messages have been communicated to their terminating devices. The parser, for instance, maintains a count of the data messages communicated responsive to the separate procedures. The count thereby identifies how many data messages have been communicated responsive to a notification procedure and how many data messages are successfully communicated responsive to the rescan procedure. The count is restarted, e.g., with each time-based, or other, initiation that defines the selected times at which the logged information is parsed.

In another aspect of the present disclosure, the counts obtained by the parser, or information otherwise obtained as a result of parsing, is provided to a ratio calculator. And, the ratio calculator operates to calculate a ratio of notification-procedure-communicated data messages to rescan-procedure-communicated data messages. Or, more generally, an indication of the incidence of delayed communication of the messages is obtained via analysis of the parsed information. In an implementation in which the count is restarted with each initiation, the corresponding ratio that is calculated is calculated for each period of parsing.

In another aspect of the present disclosure, the calculated ratio is compared with a threshold value, i.e., a comparison value. And, the comparator provides an indication of the comparison, such as an indication when the ratio of rescan-communicated messages relative to the preferred, notification-communicated data messages exceeds a threshold. In an alternate implementation, rather than calculation of ratios, the comparator compares other appropriate data, such as a count value, with a corresponding comparison value, and the comparator generates an indication if the comparison results in excessive incidence of communication pursuant to rescanned procedures rather than pursuant to notification procedures.

In another aspect of the present disclosure, an error writer generates an error report responsive to indication made by the comparator that the incidence of delayed communication of data messages exceeds the threshold formed of the comparison value. The error writer is provided to enterprise personnel to alert the personnel of the high incidence of delayed communication. The enterprise personnel are able to take corrective or ameliorative actions.

In these and other aspects, therefore, an apparatus, and an associated method, is provided for facilitating reporting on data message communication operations by way of a wireless network. An analyzer is adapted to access logged information of communication of data messages. The analyzer is configured to analyze the logged information to determine at least an indication of data messages communicated pursuant to a first procedure. A reporter is adapted to receive determination made by the analyzer responsive to analysis of the logged information. The reporter is configured to generate a report when the indication of data messages communicated pursuant to the first procedure is beyond a threshold.

Turning first, therefore, to FIG. 1, a communication system, shown generally at 110, provides for wireless communications with wireless devices, of which the wireless devices 114 are examples. The wireless devices 114 communicate with a radio access network (RAN) 116 by way of a radio air interface, here represented by the arrow 122. Communications are carried out, and the radio air interface is defined, in conformity with an operating protocol, such as a protocol defined in an operating specification promulgated by a standard-setting body. In the example implementation, the wireless devices 114 and radio access network 116 are operable in conformity with the operating specification of a data-capable, cellular communication system standard. In alternate implementations, the wireless devices and radio access network are constructed to be operable in conformity with other types of communication schemes, including, for instance, a wireless local area network. When implemented as a data-capable, cellular communication system, the network and wireless devices work in conformity with, e.g., a GSM, CDMA, EDGE, or other public-access, cellular communication operating specification.

The communication system 110 further includes a data network 126 positioned in connectivity with the radio access network 116. The data network operates to provide for data transport between the radio access network 116 and communication devices of an enterprise. The data network 126 is implemented in any of the various manners, or combinations of manners, including a privately-owned facility, switched or dedicated facilities that are furnished by a common carrier or other provider, the public internet, etc. Virtual networks are overlayable upon any of the physical entities of the data network as well as any number of intermediate facilities, networks, or providers.

The enterprise communication devices are positioned at, or controlled by, an enterprise. Here, the enterprise facility is connected to the data network by way of a firewall 128. And here, specifically, the communication devices of the enterprise include a server 132, herein referred to as an enterprise server, that includes the apparatus 144 of an embodiment of the present disclosure. The elements of the apparatus 132 are functionally represented, implementable in any desired manner, including hardware, software, firmware, and combinations thereof. And, while the example implementation shows the elements of the apparatus positioned at the server 128, in alternate implementations, the elements of the apparatus are physically located at other devices, located at the enterprise or elsewhere.

The enterprise server 128 is here further shown to be positioned in connectivity with a messaging server 136 that operates to provide for messaging services associated with email accounts. The messaging server 136 comprises any of various suitable messaging server or mail transport agents, such as a messaging server conforming to the IMAP protocol. In other implementations, the messaging server uses other protocols, e.g., MAPI, POP3, and the like. The messaging server provides email accounts, of which the email account 142 is representative. In the example implementation, the email account defines an IMAP mailbox, associated with a wireless device 114 or, if a group address, to a group of the wireless devices 114. And, as noted previously, the mail server sends a notification when a mail message appears, such as the account 142.

The server 132 operates, amongst other things, to route messages associated with email accounts, such as the email account 142 of the messaging server to a terminating device, such as a wireless device 114. Routing operations performed by the server include message pushes routing of the messages to the appropriate wireless device or devices without action taken by a user of the terminating device. The server, by routing the email message to the wireless device, provides a user of the wireless device with the data message without necessitating that the user of the wireless device be positioned at the enterprise facility in order to receive the data message.

As noted previously, a data message, e.g., the email, is communicated to a terminating device in response to a notification generated during a notification procedure. And, if the communication is not successfully completed responsive to the notification procedure, the unsent and undelivered, message is detected pursuant to a subsequent rescan procedure and communicated responsive to the rescan procedure. The rescan procedure is sometimes performed significantly subsequent to the notification procedure, e.g., the rescan procedure is performed 20 minutes subsequent to the notification procedure. If the informational content of the message is urgent, the message might not be timely delivered if the message is not delivered until performance of the rescan procedure. And, in conventional operation, there is no way by which quickly to identify and alert the incidence of the delayed communications.

The apparatus 144 of an embodiment of the present disclosure, here embodied at the server 132, facilitates detection, i.e., identification, of occurrence of an unacceptably high incidence of delayed communication of messages. By quickly identifying such occurrences, appropriate personnel can be notified and corrective or ameliorative action taken.

The apparatus 144, represented in terms of functional elements, includes an analyzer 148 formed of an initiator 150, a log parser 152, and a ratio percentage calculator 154. And, the apparatus also includes a reporter 158, here formed of a comparator 162, a comparison value 164, and an error writer 166.

The log parser 152 of the analyzer 148 is capable of accessing an enterprise-server log 172 that contains logged information. The parser operates responsive to initiation by the initiator 150. The initiator initiates operation on, e.g., a time-based or event-based schedule and initiates operations at selected intervals. Parsing by the parser is performed responsive to initiation by the initiator 150. Initiation is, e.g., timed-based, at selected intervals, periodic intervals, or by special initiation request, such as by network operating personnel.

Information is logged at the log to record indications of messages communicated during operation of the server 132 as well as the manner pursuant to which the associated messages are communicated. Here, the messages are communicated pursuant to a notification procedure and, if unsuccessfully communicated responsive to the notification procedure then subsequently pursuant to a rescan procedure. The log parser operates to access the information at the log 172 and to obtain an indication of the number, in absolute or relative terms, of the amount of messages that are delayed in their delivery by an unacceptably lengthy delay. In the example implementation, the parser counts the numbers of messages communicated pursuant to the notification procedure and the number of messages communicated pursuant to the resend procedure.

Information obtained during operation of the parser is provided to the ratio calculator 154. The ratio calculator calculates a ratio of untimely-to-timely delivered messages, indicated by the procedure pursuant to which the messages are successfully communicated.

An indication of the calculated ratio is provided to the comparator 162 of the reporter 158. The comparator also is provided with a comparator value 164 that forms a threshold value. The threshold value alternately is a selectable value, selectable, e.g., by enterprise personnel, or a fixed value, selected at system installation. The comparator 162 operates to compare the calculated value with the comparator value and to indicate whether the calculated value exceeds the comparator value. If the comparison indicates that the incidence of the delayed communication is greater than an acceptable level or amount, the comparator provides an indication to the error writer 166 that operates to generate an error report that is provided, here indicated by way of the line 168, to a network event log, or other enterprise location or entity to permit enterprise personnel to be alerted to the high incidence of delayed communications. Personnel of the enterprise are then able to make corrective or ameliorative action. In contrast to conventional techniques requiring manual review of the log 172, parsing is automatically performed, the parsed information is analyzed, an indication of the parsed information is compared with a threshold value, and if the comparison indicates a too-high incidence of delayed communication, an error report is written.

Figure 2:
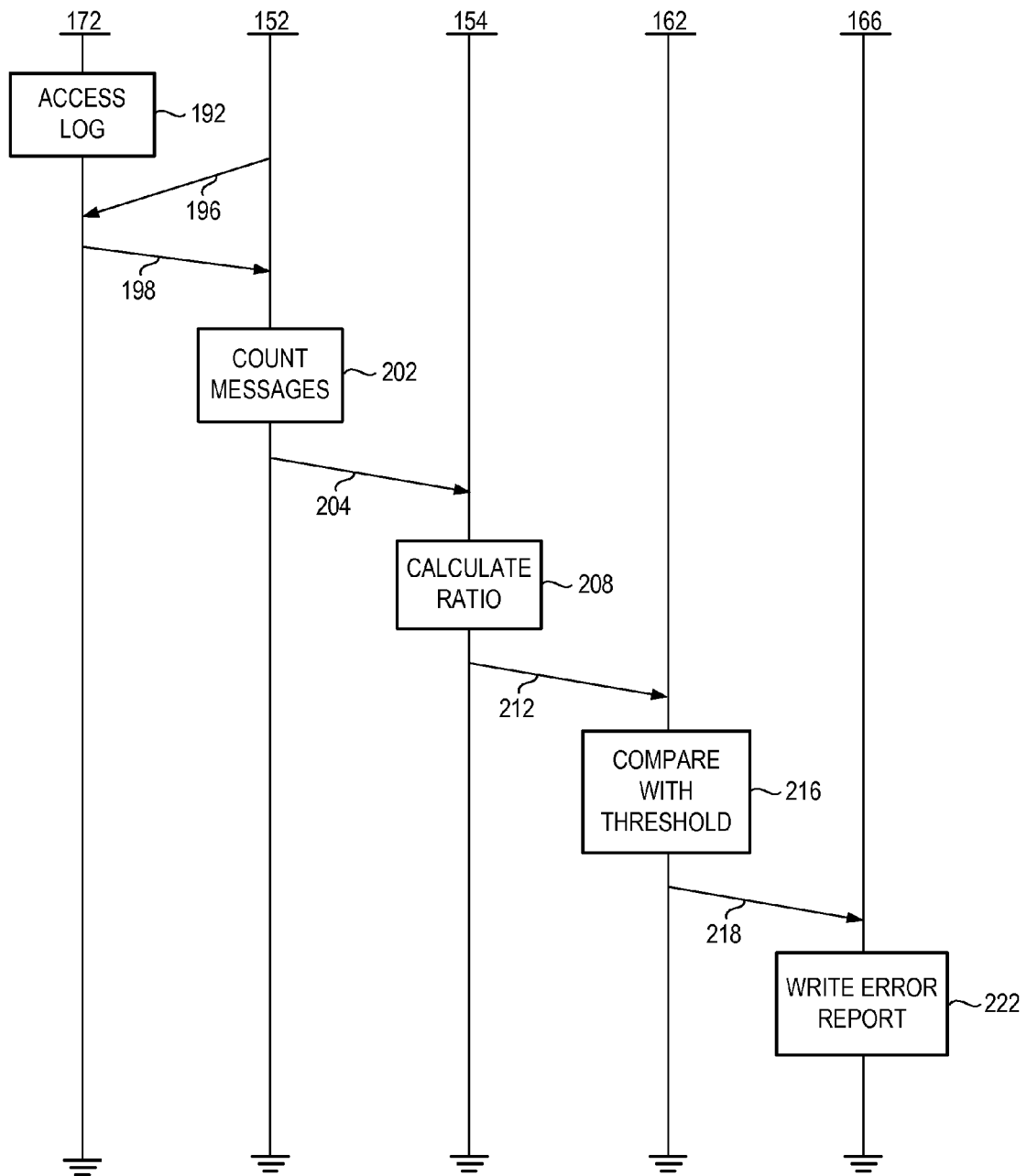
FIG. 2 illustrates a process diagram representative of the process of operation of an embodiment of the present disclosure.

FIG. 2 illustrates a process diagram, shown generally at 186, representative of the process of operation of an embodiment of the present disclosure. The process is described with respect to the example implementation shown in FIG. 1. In other implementations, the process is carried out in other manners.

First, and as indicated by the block 192, an enterprise-server log is made available for reading of its contents. The log is created by recording indications of communicated messages together with the manner by which the messages have been successfully communicated. The log contains, e.g., an identification of each communicated message and, indexed together therewith, the associated manner of communication, such as notification or rescan. Then, as indicated by the segments 196 and 198, the logged information is parsed. Then, as indicated by the block 202, the number of occurrences of timely communications and delayed communications are made. An indication is provided, indicated by the segment 204, to the calculator 154. And the calculator calculates, indicated by the block 208, a ratio of the counted occurrences of delayed communications to timely communications.

An indication of the calculated ratio is provided, here indicated by the segment 212, to the comparator 162. The comparator makes a comparison, indicated by the block 216, with a threshold value. And, the comparator generates an indication that is provided, here indicated by the segment 218, to an error writer 166. The error writer generates an error report, indicated by the block 222.

Figure 3:
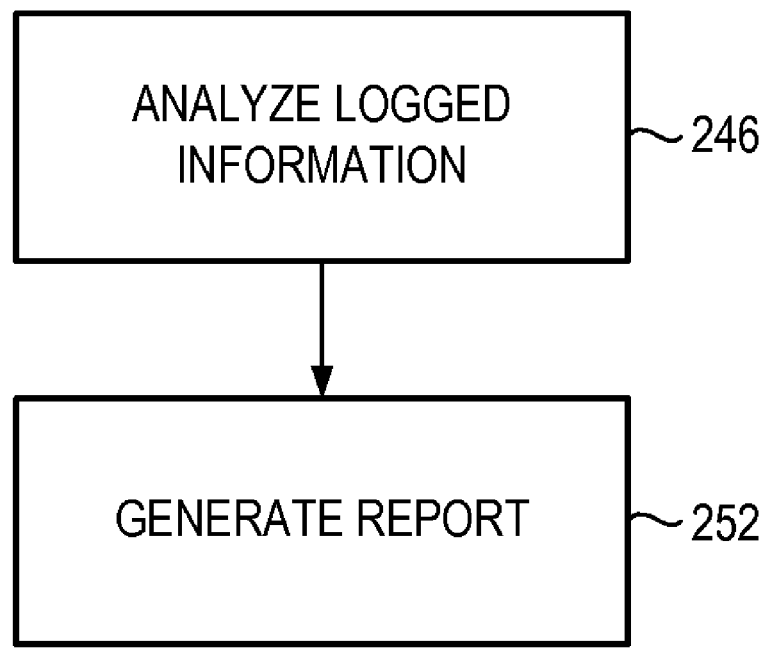
FIG. 3 illustrates a method flow diagram representative of the method of operation of the method of an embodiment of the present disclosure.

FIG. 3 illustrates a method flow diagram, shown generally at 242, representative of the method of operation of an embodiment of the present disclosure. The method facilitates reporting on data message communication operations by way of a wireless network.

First, and as indicated by the block 246, logged information of communication of data messages is analyzed to determine at least an indication of data messages communicated pursuant to a first procedure.

Then, and as indicated by the block 252, a report is generated when the indication is determined to be beyond a threshold.

Analysis of the logged information is performed automatically, obviating conventional, manual review of logged information, to determine quickly if a high incidence of delayed communication of messages is exhibited. Quicker enterprise response to compensate for the high incidence of delay can be more quickly undertaken.

Presently preferred embodiments of the disclosure and many of its improvements and advantages have been described with a degree of particularity. The description is of preferred examples of implementing the disclosure and the description of preferred examples is not necessarily intended to limit the scope of the disclosure. The scope of the disclosure is defined by the following claims.

What is claimed is:

1. A communications system having a reporting of delayed message delivery, said communications system comprising:
   an enterprise server configured to route data messages associated with an email account to a wireless terminating device and detect and log when communication of the routed message is not completed responsive to a first procedure, configured to analyze the logged information with an analyzer to determine at least an indication of data messages communicated responsive to the first procedure, and configured to generate a report with a reporter when the indication of data messages communicated responsive to the first procedure is beyond a threshold.

2. The communications system of claim 1 wherein the indication of the data messages comprises a count of the data messages communicated responsive to the first procedure.

3. The communications system of claim 2 wherein the indication of the data messages comprises a function of the count of the data messages communicated responsive to the first procedure.

4. The communications system of claim 3 wherein the indication of the data messages comprises a ratio of the count of the data messages communicated responsive to the first procedure and a count of the data messages communicated responsive to a second procedure.

5. The communications system of claim 1 wherein said analyzer of said enterprise server is further configured to determine at least an indication of data messages communicated responsive to a second procedure.

6. The communications system of claim 5 wherein the second procedure comprises a notification procedure.

7. The communications system of claim 1 wherein the first procedure comprises a rescan procedure.

8. The communications system of claim 1 wherein said analyzer of said enterprise server is configured to access the logged information at selected intervals and wherein said reporter is configured to generate the report responsive to analysis made by said analyzer responsive to the access made during the access at any selected interval.

9. The communications system of claim 1 wherein said analyzer of said enterprise server comprises a logged information parser configured to parse the logged information to determine the indication of the data messages communicated responsive to the first procedure.

10. The communications system of claim 9 wherein said logged information parser is further configured to parse the logged information to determine an indication of data messages communicated responsive to a second procedure.

11. The communications system of claim 10 wherein said analyzer of said enterprise server further comprises a ratio calculator configured to calculate a ratio of the indication of the data messages communicated responsive to the first procedure and of the indication of the data messages communicated responsive to the second procedure.

12. The communications system of claim 11 wherein said reporter of said enterprise server further comprises a comparator configured to compare the ratio calculated by said ratio calculator with the threshold.

13. The communications system of claim 12 wherein said reporter of said enterprise server further comprises an error writer configured to write an error message forming the report when the ratio is beyond the threshold.

14. The communications system of claim 1 wherein said reporter of said enterprise server further comprises a comparator configured to compare the indication with the threshold.

15. A method for facilitating reporting on data message communication operations by way of a wireless network, said method comprising:
   analyzing logged information of communication of data messages to determine at least an indication of data messages communicated responsive to a first procedure and an indication of data messages communicated responsive to a second procedure; and
   generating a report when a ratio of the indication of the data messages responsive to the second procedure and the indication of the data messages responsive to the first procedure is determined during said analyzing to be beyond a threshold.

16. The method of claim 15 wherein the first procedure is performed subsequent to the second procedure.

17. The method of claim 15 further comprising logging the logged information during the communication of data messages.

18. A communications system having a check of success of notification-procedure sending of data messages, said communications system comprising:
   a messaging server configured to provide email accounts; and
   an enterprise server configured to route data messages associated with an email account provided by the messaging server to a wireless terminating device and detect and log when communication of the routed message is not completed responsive to a first procedure, configured to compare a ratio of notification-procedure-sent data messages and rescan-procedure-sent data messages, and configured to report an error condition if said ratio comparison indicates the ratio to be greater than a threshold.

* * * * *